US008841375B2

(12) United States Patent
Peri et al.

(10) Patent No.: US 8,841,375 B2
(45) Date of Patent: Sep. 23, 2014

(54) ISOLABLE AND REDISPERSABLE TRANSITION METAL NANOPARTICLES THEIR PREPARATION AND USE AS IR ABSORBERS

(75) Inventors: Francesca Peri, Bologna (IT); Samanta Cimitan, Ponte di Piave (IT); Markus Grob, Reinach (CH)

(73) Assignee: BASF SE, Ludwigshafen (DE)

( * ) Notice: Subject to any disclaimer, the term of this patent is extended or adjusted under 35 U.S.C. 154(b) by 1021 days.

(21) Appl. No.: 12/678,939

(22) PCT Filed: Sep. 19, 2008

(86) PCT No.: PCT/EP2008/062515
§ 371 (c)(1),
(2), (4) Date: Mar. 18, 2010

(87) PCT Pub. No.: WO2009/056401
PCT Pub. Date: May 7, 2009

(65) Prior Publication Data
US 2010/0261827 A1    Oct. 14, 2010

(30) Foreign Application Priority Data

Sep. 27, 2007  (EP) .................................. 07117330

(51) Int. Cl.
| | |
|---|---|
| *C08K 3/08* | (2006.01) |
| *B22F 9/18* | (2006.01) |
| *B22F 9/24* | (2006.01) |
| *B82Y 30/00* | (2011.01) |
| *C22B 3/00* | (2006.01) |
| *C22B 5/00* | (2006.01) |
| *B22F 1/00* | (2006.01) |

(52) U.S. Cl.
CPC . *B22F 9/24* (2013.01); *C22B 11/04* (2013.01); *B22F 2998/00* (2013.01); *B82Y 30/00* (2013.01); *C22B 5/00* (2013.01); *B22F 2999/00* (2013.01); *B22F 2001/0037* (2013.01); *B22F 2001/0033* (2013.01)
USPC ........... 524/440; 524/413; 524/435; 524/403; 420/513; 420/501; 420/507; 420/8

(58) Field of Classification Search
USPC ....................................................... 524/440
See application file for complete search history.

(56) References Cited

U.S. PATENT DOCUMENTS

| | | | |
|---|---|---|---|
| 6,366,333 B1 | 4/2002 | Yamamoto et al. | |
| 7,074,351 B2 | 7/2006 | Doebler et al. | |
| 2002/0177143 A1* | 11/2002 | Mirkin et al. ...................... | 435/6 |
| 2003/0122114 A1 | 7/2003 | Dobler et al. | |
| 2003/0177868 A1 | 9/2003 | Guillet | |
| 2003/0199653 A1* | 10/2003 | McCormick et al. ...... | 526/219.6 |
| 2004/0038506 A1 | 2/2004 | Kataoka et al. | |
| 2004/0147618 A1 | 7/2004 | Lee et al. | |
| 2006/0191373 A1 | 8/2006 | Guillet | |
| 2007/0043179 A1 | 2/2007 | McCormick, III et al. | |
| 2007/0134491 A1* | 6/2007 | Atsuki et al. .................. | 428/402 |
| 2008/0295646 A1 | 12/2008 | Mirkin et al. | |
| 2009/0291236 A1* | 11/2009 | Sasada et al. .................. | 428/1.1 |
| 2010/0032608 A1 | 2/2010 | Peri et al. | |

FOREIGN PATENT DOCUMENTS

| | | |
|---|---|---|
| DE | 10 2005 019 391 | 10/2006 |
| EP | 1 342 518 | 9/2003 |
| WO | 01 90226 | 11/2001 |
| WO | 02 087749 | 11/2002 |
| WO | 02 096262 | 12/2002 |
| WO | 2004 089813 | 10/2004 |
| WO | 2005 030878 | 4/2005 |
| WO | 2005 072947 | 8/2005 |
| WO | 2006 099312 | 9/2006 |
| WO | 2006 132643 | 12/2006 |
| WO | WO2006/132643 | * 12/2006 |
| WO | 2009 059900 | 5/2009 |
| WO | 2009 059901 | 5/2009 |

OTHER PUBLICATIONS

Murphy, John; Additives for Plastics, 2001 Elsevier, pp. 109-111.*
U.S. Appl. No. 12/740,114, filed Apr. 28, 2010, Lehmann, et al.
U.S. Appl. No. 12/739,166, filed Apr. 22, 2010, Mamak, et al.
Chinese Office Action issued Nov. 24, 2011 in patent application No. 200880108841.7 with English translation.
Jianwen Yang, et al., "UV-Curing Coatings and Applications", Chemical Industry Press and Publishing Center of Materials Science and Engineering, 1st edition, Jan. 2005, pp. 377-380.
U.S. Appl. No. 12/671,547, filed Feb. 1, 2010, Campbell, et al.
U.S. Appl. No. 61/197,102, filed Oct. 23, 2008, Lehmann, et al.
U.S. Appl. No. 61/192,731, filed Sep. 22, 2008, Peri, et al.
U.S. Appl. No. 13/122,563, filed Apr. 5, 2011, Mamak, et al.

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

The instant invention relates to easily isolable and re-dispersible transition metal nanoparticles, their manufacture and use as IR-absorbers, in particular in transparent thermoplastic or crosslinkable polymers. A further aspect of the invention is a composition of these transition metal nanoparticles and thermoplastic or crosslinkable polymers and an architectural or automotive glazing containing these transition metal nanoparticles.

20 Claims, 5 Drawing Sheets

Figure 1A:
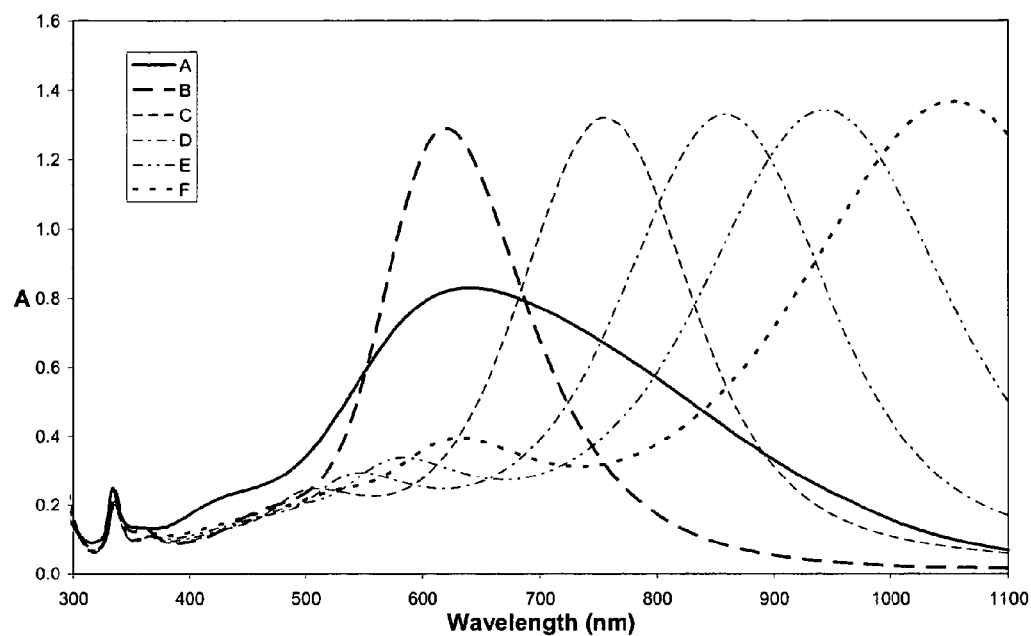

ISOLABLE AND REDISPERSABLE TRANSITION METAL NANOPARTICLES THEIR PREPARATION AND USE AS IR ABSORBERS

CROSS REFERENCE TO RELATED APPLICATION

This application is a 371 of PCT/EP2008/062515, filed on Sep. 19, 2008, and claims priority to European Patent Application No. 07117330.6, filed on Sep. 27, 2007.

The instant invention relates to easily isolable and re-dispersible transition metal nanoparticles, their manufacture and use as IR-absorbers, in particular in transparent thermoplastic or crosslinkable polymers. A further aspect of the invention is a composition of these transition metal nanoparticles together with a thermoplastic or crosslinkable polymer and their use as IR absorber in an architectural or automotive glazing.

The absorption of near infrared radiation (NIR) is an important technical issue in various fields. A significant reduction of the heat transfer into buildings and cars is possible by blocking or filtering the near infrared part of the solar spectrum. This allows a considerable energy saving, mainly due to a smaller demand for air conditioning.

Up to now several solutions have been proposed and more and more have been applied on glazing surfaces of many buildings, such as interference reflective films, semi-conducting or conducting films: they are all able to reflect, with good selectivity, NIR radiation. The so-called "low-e" windows are for example reflective coated mineral or polymeric glasses. However the production of such coatings is an extremely time consuming step, specially considering that almost all solutions need several layers, and that the durability may be also quite limited due to a generally low scratch resistance. This is, for example, described in WO 2005/072947.

Another approach is the use of bulk additives that absorb the NIR radiation. This approach is less expensive, not time consuming, long lasting and particularly needed for thermoplastic polymers used in glazing. Some examples for polymers used in glazing applications are polycarbonates (PC), polyesters like PET-G, polymethylmethacrylate (PMMA), polyvinylbutyral (PVB) and others. Mainly used for agricultural applications are polyolefin films.

For this purpose several NIR absorbing dyes and pigments have been proposed and are commercially available, such as phthalocyanines and quaterrylenes (i.e.: LUMOGEN® 788 or 765 from BASF).

More recently nanoparticles have gained a lot of interest in the scientific community. This is because nanoparticles, normally of inorganic nature, fulfill almost entirely most of the plastic application requirements, such as efficient heat shielding properties, high thermal and long-term photo-stability, high transmittance in the visible range and absence of color. Examples are lanthanum boride ($LaB_6$) and indium tin oxide (ITO). On the other hand, the necessary loading for $LaB_6$ gives the final product a strong green color, while the use of ITO is very expensive due to the constantly increasing cost of indium.

Also silver and gold nanoparticles have been described. WO 2006/132643 describes a thermal method of preparing metal, in particular silver nanoprisms in the form of colloidal suspension. WO 2004/089813 describes a photochemical method for preparing silver nanoprisms of controlled edge through wavelength modulation. WO 2006/099312 describes the synthesis of Au-nanoprisms. All these documents refer to nanoparticles or nanoclusters as important class of materials for chemical- and bio-detection, catalysis, optics and data storage.

The nanomaterials of the prior art can not easily be isolated and re-dispersed maintaining their optical properties. No examples are disclosed of using such materials as near-infrared absorbers and in particular as melt processable additives.

The instant invention relates to nanoparticles made of a transition metal selected from the group consisting of Zn, Ag, Cu, Au, Ta, Ni, Pd, Pt, Co, Rh, Ir, Fe, Ru, and Ti, in particular to nanoplatelets, characterized by a surface plasmon resonance in the near infrared range. These transition metal nanoparticles are ideally suited as heat shielding additives in plastic articles. In particular, the invention refers to a method of preparing such nanoplatelets in a way that allows their isolation and re-dispersion preserving their special morphology and therefore their use as additives for plastic articles.

These transition metal nanoplatelets are prepared using a surface stabilizer monomer or polymer that allows high vacuum drying of the aqueous dispersion (acrylates, such as hydroxypropyl methacrylate, isobornyl acrylate and 1.6 hexanediol acrylate, as well as their corresponding polymers, plus amines, such as allyl amine, N-[3-(dimethylamino)propyl]-methacrylamide, 2-(dimethylamino)ethylmethacrylate, and dispersants, such as E-4300 and E-4401 supplied by EFKA. The material after isolation and re-dispersion maintains its optical properties.

With bulkier acrylates, the use of appropriate dispersants and amines the particles keep their morphology, and therefore their absorption, and can easily be redispersed, for example, in methylmethacrylate. This is particularly the case for those platelets absorbing more into the NIR. Such an aspect is essential for the use in plastic matrices such as polycarbonate and methylmethacrylates. The possibility to have homogeneous dispersions in methylmethacrylate allows using the dispersion as such in order to radically polymerize the monomer to PMMA for the manufacture of the final product. The formulation can be as well used for PC applications.

Transparency is high and the product is almost colorless or slightly bluish which is acceptable for such products.

One aspect of the invention is a method for the preparation of an aqueous dispersion of nano shaped transition metal particles, selected from the group consisting of Zn, Ag, Cu, Au, Ta, Ni, Pd, Pt, Co, Rh, Ir, Fe, Ru, and Ti, which can be isolated and re-dispersed comprising
a) adding to an aqueous solution of the transition metal salt an acrylate or methacrylate monomer or oligomer, or a polyacrylate or polymethacrylate and a reducing agent;
b1) treating the colloidal solution with a peroxide; or
b2) exposing the colloidal solution to UV- or visible light; and
c) isolating the nano shaped transition metal particles or re-disperse the nano shaped transition metal particles together with a dispersing agent in a liquid acrylate or methacrylate monomer.

In a specific embodiment the invention is a method for the synthesis, isolation and re-dispersion in organic matrixes of nano shaped transition metal particles, selected from the group consisting of Zn, Ag, Cu, Au, Ta, Ni, Pd, Pt, Co, Rh, Ir, Fe, Ru, and Ti comprising
a) adding to an aqueous solution of the transition metal salt an acrylate or methacrylate monomer or oligomer, or a polyacrylate or polymethacrylate and a reducing agent;
b1) treating the colloidal solution with a peroxide; or
b2) exposing the colloidal solution to UV- or visible light;
c) adding a water soluble amine; and d) isolating the nano shaped transition metal particles or re-disperse the nano shaped transition metal particles together with a dispersing agent in a liquid acrylate or methacrylate monomer.

Optionally the reaction mixture may contain up to 50 mM/liter of a buffer system, such as sodium citrate.

Preferably the transition metal is Ag, Cu or Au, more preferably Ag. It is also possible that the nanoparticles are made from two of the above mentioned transition metals to form core-shell type nanoparticles.

For example the transition metal is silver and the silver(I) salt is selected from the group consisting of $AgNO_3$, $CH_3CO_2Ag$, $AgClO_4$, $Ag_2SO_4$, $Ag_2O_3$, $AgBF_4$, $AgIO_3$, AgCl, AgI and AgBr. Most preferred is $AgNO_3$.

In another embodiment the transition metal is gold and the gold salt is selected from the group consisting of: $Au(CN)_2K$, AuI, AuBr, AuCl, $CH_3CO_2Au$, $HAuCl_4$, $AuBr_3$, $AuBr_4K$, $AuBr_4Na$, $AuCl_3$, $AuCl_4K$ and $AuCl_4Na$. Most preferred is $HAuCl_4$.

When the transition metal is copper, the copper salt is selected from the group consisting of: $Cu(NO_3)_2$, $KCu(CN)_2$, copper(II) acetylacetonate, copper(II)acetate, $Cu(ClO_4)_2$, $CuBr$, $CuBr_2$, CuCl, $CuCl_2$, CuI and $Cu(SO_4)$.

When a monomeric or oligomeric acrylate or methacrylate is used, this can be polyfunctional trifunctional, difunctional or monofunctional.

The acrylate or methacrylate may be low molecular weight (monomeric) or higher molecular weight (oligomeric). Examples of monomers are alkyl and hydroxyalkyl acrylates and methacrylates, e.g. methyl, ethyl, butyl, 2-ethylhexyl and 2-hydroxyethyl or 2-hydroxypropyl acrylate or methacrylate, isobornyl acrylate, tetrahydrofurfuryl acrylate and methacrylate, isophoryl acrylate and methacrylate, 2-phenoxyethyl acrylate and methacrylate and methyl and ethyl methacrylate. Also of interest are silicone acrylates. Further examples are acrylonitrile, acrylamide, methacrylamide and N-substituted (meth)acrylamides.

Examples of monomers having several double bonds are ethylene glycol diacrylate, propylene glycol diacrylate, neopentyl glycol diacrylate, hexamethylene glycol diacrylate, bisphenol-A diacrylate, 4,4'-bis(2-acryloyloxyethoxy)diphenylpropane, trimethylolpropane triacrylate, pentaerythritol triacrylate, pentaerythritol tetraacrylate or vinyl acrylate.

Examples of higher molecular weight (oligomeric) polyunsaturated compounds are acrylated epoxy resins, acrylated polyesters, polyurethanes and polyethers.

Further examples of acrylate, methacrylate monomers or oligomers are, for example, trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol di- and tri-acrylate, 1,4-cyclohexane diacrylate, bisacrylates and bismethacrylates of polyethylene glycol having a molecular weight of from 200 to 1500, and mixtures thereof.

Examples of unsaturated amides are: methylene bisacrylamide, 1,6-hexamethylene bisacrylamide, diethylenetriamine trismethacrylamide, bis(methacrylamidopropoxy)ethane, β-methacrylamidoethyl methacrylate and N-[(β-hydroxyethoxy)ethyl]-acrylamide.

Preference is given to hydroxyalkylacrylates and methacrylates, such as hydroxyethyl and hydroxypropyl acrylate and methacrylate.

In another embodiment of the invention preference is given to sterically bulky acrylates and methacrylates. Examples are the norbornyl, 1,6-hexandiol di acrylate, tetrahydrofurfuryl and isophoryl acrylates and methacrylates.

Examples of amines are: allyl amine, hexyl amine, alkyl amines, acrylic amines.

For example the amines are of formula

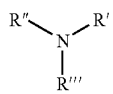

wherein

R', R", R'" are independently from each other hydrogen, $C_1$-$C_{18}$alkyl, $C_2$-$C_{18}$alkenyl, $C_2$-$C_{18}$alkinyl, phenyl or a group

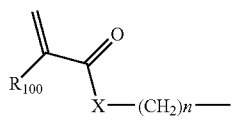

wherein X is O or NH and $R_{100}$ is hydrogen or methyl; and n is a number from 1 to 12.

Preference is given to N-[3-(dimethylamino)propyl]methacrylamide, 2-(N,N-dimethylamino)ethylmethacrylate and allyl amine.

Typically the molar ratio of amine to silver (calculated as atomaric silver) is from 5:1 to 1000 to 1 preferably from 10:1 to 100:1.

For example the monofunctional monomeric acrylate is of formula (I)

$$CH_2=C(R_a)-(C=O)-R_b, \qquad (I)$$

wherein $R_a$ is hydrogen or $CH_3$, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, $C_5$-$C_{11}$heterocycloalkyl, hydroxy-substituted $C_1$-$C_{18}$alkylamino or hydroxy-substituted di($C_1$-$C_{18}$alkyl)amino, $-O-CH_2-CH_2-N(CH_3)_2$ or $-O-CH_2-CH_2-N^+H(CH_3)_2An^-$ or the residue of a bi- or tricyclic hydrocarbon;

$An^-$ is a anion of a monovalent organic or inorganic acid;

Me is a monovalent metal atom or the ammonium ion.

Examples for $R_b$ as $C_2$-$C_{100}$alkoxy interrupted by at least one O atom are of formula

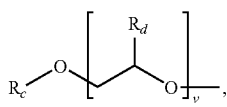

wherein $R_c$ is $C_1$-$C_{25}$alkyl, phenyl or phenyl substituted by C1-$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

When a polyacrylate or polymethacrylate is used it is based, for example, on one or more of the monomers mentioned above. In particular, the polyacrylate or polymethacrylate is prepared from a monomer or monomer mixture according to formula (I).

In the context of the present invention it is also possible to copolymerize different monomers.

The monomers, oligomers and polymers mentioned above are known and in their majority items of commerce.

For example the reducing agent is selected from the group consisting of boranes, copper hydride, diborane, diisobutylaluminum hydride, ascorbic acid, dimethylsulfide borane, formaldehyde, formic acid, hydrazine, isopropanol, lithium aluminum hydride, lithium tetrahydridoaluminate, nickel, nickel borohydride, oxalyc acid, polymethylhydrosiloxane, sodium bis(2-methoxyethoxy)aluminumhydride, sodium borohydride, sodium cyanoborohydride, sodium hydrosulfite, sodium tetrahydroborate, sodium triacetoxyborohydride, tributylstannane, tributyltin hydride, trichlorosilane, triphenylphosphine, triphenylphosphite, triethylsilane, tris(trimethylsilyl)silane and sodium borohydride.

Preference is given to sodium borohydride ($NaBH_4$) and ascorbic acid.

For instance the peroxide is selected from the group consisting of $H_2O_2$, acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy) 3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis(t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide and 3,3,6,6,9,9-hexamethyl 1,2,4,5-tetraoxa cyclononane.

Preference is given to $H_2O_2$.

When the colloidal solution is exposed to UV or visible light it can be the whole wave length region from 250 nm to 750 nm or preferably a selected wave length region, such as from 300 to 370 nm or from 500 to 700 nm. It is also possible to use monochromatic light sources and expose to monochromatic light. Light sources, such as lasers or mercury vapor lamps are suitable and commercially available.

Typically the process is carried out in water or in a mixture of a water soluble organic solvent and water. Suitable organic solvents are, for example, alcohols. The ratio between water and organic solvent is not critical, however, an excess of water is preferred.

When the process step b1) is applied, this reaction step is preferably carried out at a temperature from 20 to 40° C.

When step b2) is applied and the solution is irradiated, the temperature should not exceed 80° C., it should preferably be hold between 40 and 70° C.

Typical reaction times for the steps a) and b) range from 0.5 to 4 hours, preferably from 0.5 to 2 hours. The reaction is typically applied under normal pressure, and normal atmosphere. However, in some cases it might be of advantage to use an inert gas atmosphere. Suitable gases are argon or nitrogen.

The concentration of the educts is not particularly critical. Suitable concentrations for the transition metal salts are, for example from 0.01 to 2.0 mM (or mmol/liter), for the reducing agent 0.1 to 5.0 mM and for the peroxide from 10 to 250 mM.

When a monomeric or oligomeric acrylate or methacrylate is used, it is applied typically in a concentration from 0.1 to 2.0 mM and when a respective polymer is used, the concentration is typically from 0.001% to 0.1% by weight, based on the weight of the whole reaction mixture.

The amine is used typically in a concentration from 0.01 to 50 mM

The dispersing agent may be anionic or non-ionic. Examples for anionic dispersing agents are given below. The following products, especially, come into consideration: condensation products of aromatic sulfonic acids and formaldehyde, condensation products of aromatic sulfonic acids with unsubstituted or chlorinated biphenyls or biphenyl oxides and optionally formaldehyde, (mono-/di-)alkylnaphthalenesulfonates, sodium salts of polymerised organic sulfonic acids, sodium salts of polymerised alkylnaphthalenesulfonic acids, sodium salts of polymerised alkylbenzenesulfonic acids, alkylarylsulfonates, sodium salts of alkyl polyglycol ether sulfates, polyalkylated polynuclear arylsulfonates, methylene-linked condensation products of arylsulfonic acids and hydroxyarylsulfonic acids, sodium salts of dialkylsulfosuccinic acids, sodium salts of alkyl diglycol ether sulfates, sodium salts of polynaphthalenemethanesulfonates, ligno- or oxyligno-sulfonates or heterocyclic polysulfonic acids.

Especially suitable anionic dispersing agents are condensation products of naphthalene-sulfonic acids with formaldehyde, sodium salts of polymerised organic sulfonic acids, (mono-/di-)alkylnaphthalenesulfonates, polyalkylated polynuclear arylsulfonates, sodium salts of polymerised alkylbenzenesulfonic acid, lignosulfonates, oxylignosulfonates and condensation products of naphthalenesulfonic acid with a polychloromethylbiphenyl.

Examples for non-ionic dispersing agents are, for example, a condensation product of from 3 to 8 mols of ethylene oxide with 1 mol of primary alcohol containing from 9 to 15 carbon atoms.

Particularly suitable are copolymeric non-ionic dispersants having an amine functionality. Such dispersants are commercially available, for example as EFKA 4300 or EFKA 4401 or Nuosperse FX9086.

Typically the weight % of silver (on atomic basis) in the dispersant matrix is from 0.1 to 10%, preferably from 0.2 to 2%)

The nano shaped transition metal particles are typically in the form of nanocages, nanoprisms, nanotriangles, nanostars (branched particles), nanocubes, nanocrescents, nanodisks, nanoplatlets, nanospheres, nanowires, nanorods, nanohexagons, nanospheroids, nanocylinders, nanolens-shaped, nano cone-shaped, pyramids, various nanopolyhedra or hollow structures.

For example the nano shaped transition metal particles extent to a length of 15-500 nm and a thickness of 2-30 nm or the three axis defining them are between 2 and 250 nm.

Consequently the nano shaped transition metal particles, which can be isolated and re-dispersed, and which are prepared as described above, are also a subject of the instant invention.

Another aspect of the invention is a composition comprising
a) a transparent or translucent thermoplastic or crosslinked polymer and
b) nano shaped particles, prepared according to the method as described above.

The amount of light transmitted through the present materials, i.e. degree of translucency or transparency, mainly depends on well known parameters such as the particle loading, further additives used, haze level of the polymer matrix and thickness of the material. The present materials usually are at least 60% translucent in each part of the visible range (400-800 nm); preferred materials have good transparency, and especially are selected from clear-transparent sheets and films of thickness less than 10 mm (e.g. 0.01 to 5 mm) or thick sheets of all possible dimension. Preferred materials further share one or more of the following advantageous properties: a full solar radiation transmittance (340-1800 nm) of less than 60%,
a low haze value and
a full visible light transmittance (400-800 nm) of more than 60%.

A wide variety of polymers may be used. Examples are given below.

Polycarbonate (PC) or a coating or coextruded layer on polycarbonate, polyesters, acrylics, halogenated polymers such as polyvinylchloride (PVC), polyolefins, aromatic homopolymers and copolymers derived from vinyl aromatic monomers and graft copolymers thereof such as acrylnitril-butadiene-styrene terpolymer (ABS), containing these polymers as major component or in essentially pure form (e.g. 50-100% b.w.), especially:
a polymer selected from PC, polymethylmethacrylate (PMMA), polyethyleneterephthalate (PET, PET-G), PVC, transparent ABS, polyvinylidene fluoride (PVDF), styrene-acrylnitril copolymer (SAN), polypropylene (PP), polyethylene (PE) including blends, alloys, co-polymers.

Also suitable are polyvinylacetales such as polyvinylbutyral (PVB).

Polymers useful within the present invention include also the following ones:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
radical polymerisation (normally under high pressure and at elevated temperature).
b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethyllene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stepreoblock polymers are also included.

5. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile (SAN), styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 4), for example the copolymer mixtures known as ABS, MBS, ASA or AES polymers.

7. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride (PVC), polyvinylidene chloride, polyvinyl fluoride, polyvinylidene fluoride (PVDF), as well as copolymers thereof such as vinyl chloride/vinylidene chloride, vinyl chloride/vinyl acetate or vinylidene chloride/vinyl acetate copolymers.

8. Polymers derived from α,β-unsaturated acids and derivatives thereof such as polyacrylates and polymethacrylates; polymethyl methacrylates (PMMA), polyacrylamides and polyacrylonitriles, impact-modified with butyl acrylate.

9. Polyesters derived from dicarboxylic acids and diols and/or from hydroxycarboxylic acids or the corresponding lactones, for example polyethylene terephthalate (PET), polybutylene terephthalate (PBT), poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

10. Polycarbonates and polyester carbonates, examples have been already given above.

Suitable polyvinylacetales include polymers derived from unsaturated alcohols and amines (i.e. acyl derivatives or acetals thereof), for example polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

Incorporation of the transition metal nano particles into the polymer matrix leads to plastic articles which are highly transparent; they may be colorless (e.g. for clear glazings or films) or colored, e.g. by addition of a pigment or mixture of pigments, e.g. for applications wherein suitable light filtering or sun screening is desired. The present transition metal nano particles allow high loading, giving access to high heat shielding effects.

Preferable loadings are from 0.001 to 10%, especially 0.003 to 5% by weight of the nano particles including dispersants, based on the weight of the final polymer composition. The amount of silver alone is typically from 0.001 to 1% by weight based on the final polymer composition.

The above polymers are all thermoplastic polymers. It is, however, also possible to incorporate the instant nano shaped transition metal particles into a curable/crosslinkable coating, which is applied to a transparent substrate, such as glass or one of the polymers mentioned above. Examples for curable/crosslinkable coatings are given below.

1. Crosslinked polymers derived from aldehydes on the one hand and phenols, ureas and melamines on the other hand, such as phenol/formaldehyde resins, urea/formaldehyde resins and melamine/formaldehyde resins.

2. Unsaturated polyester resins derived from copolyesters of saturated and unsaturated dicarboxylic acids with polyhydric alcohols and vinyl compounds as crosslinking agents, and also halogen-containing modifications thereof of low flammability.

3. Crosslinkable acrylic resins derived from substituted acrylates, for example epoxy acrylates, urethane acrylates or polyester acrylates.

4. Alkyd resins, polyester resins and acrylate resins crosslinked with melamine resins, urea resins, isocyanates, isocyanurates, polyisocyanates or epoxy resins.

5. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

In general thermoplastic polymers are preferred.

Preferably the thermoplastic or crosslinkable polymer comprises polycarbonate, a coating or coextruded layer on polycarbonate, polyesters, acrylics, halogenated polymers, such as polyvinylchloride, polyolefins, aromatic homopolymers and copolymers derived from vinyl aromatic monomers and graft copolymers thereof such as acrylnitril-butadiene-styrene terpolymer, and polyvinylacetales; as well as blends, alloys and co-polymers thereof.

In a specific embodiment of the invention the thermoplastic or crosslinkable polymer comprises polycarbonate, polymethylmethacrylate, polyethyleneterephthalate, polyvinylchloride, transparent ABS, polyvinylidene fluoride, styreneacrylnitril copolymer, polypropylene, polyethylene, or mixtures thereof.

From the thermoplastic polymers polyacrylates and polycarbonate are most preferred.

The composition described above may contain as further component a conventional additive selected from antioxidants, flame retardants, clarifiers, UV absorbers and/or sterically hindered amines, pigments and other NIR absorbers, such as ATO, ITO, $LaB_6$, $WO_x$, doped WYOx, ZnO or doped ZnYO, cyanines, phthalocyanine, Lumogen 788 or other quaterrylene, dithiolenes and other metal complexes.

Examples are given below.

1. Antioxidants 1.1. Alkylated monophenols, for example 2,6-di-tert-butyl-4-methylphenol, 2-tert-butyl-4,6-di-methyl phenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1-yl)phenol, 2,4-dimethyl-6-(1-methylheptadec-1'-yl) phenol, 2,4-dimethyl-6-(1'-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(-methylbenzyl)-4-nonylphenol], 2,2'-methylenebis[6-(α, α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3, 5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1, 3,5-tris(3,5-di-tert-butyl-4-hydroxybenzyl)-2,4,6-trimethylbenzene, 1,4-bis(3,5-di-tert-butyl-4-hydroxybenzyl)-2,3,5, 6-tetramethyl benzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethyl butyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydro-oxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydro-oxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyldihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred: Tris(2,4-di-tert-butylphenyl) phosphite (Irgafos 168, Ciba Specialty Chemicals Inc.), tris(nonylphenyl) phosphite, (A)

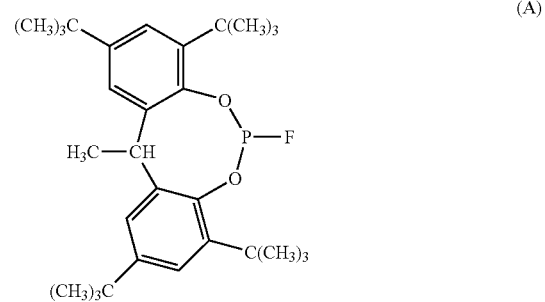

(B)

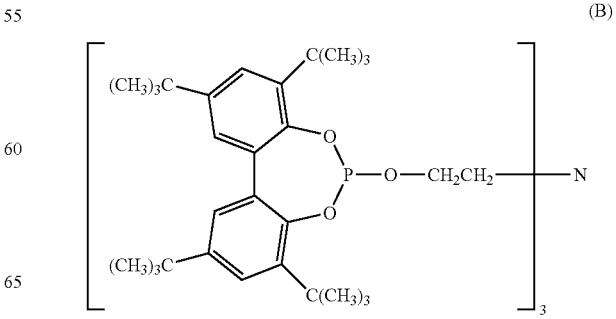

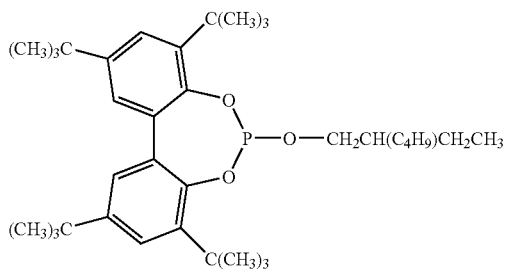
(C)

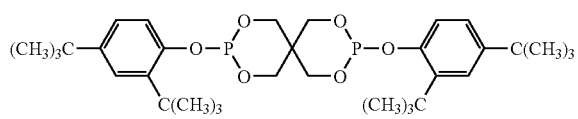
(D)

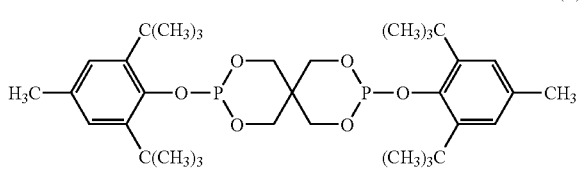
(E)

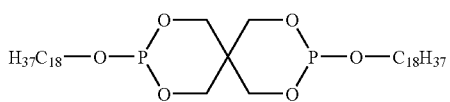
(F)

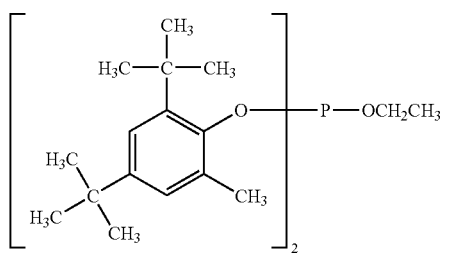
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of δ-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxy-ethoxy)phenyl]benzofuran-2-one, 3,3'-bis[5,7-di-tert-butyl-3-[4-(2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctyl-benzofuran-2-one.

Specific UV-absorbers to be mentioned in the present invention are the following:

19
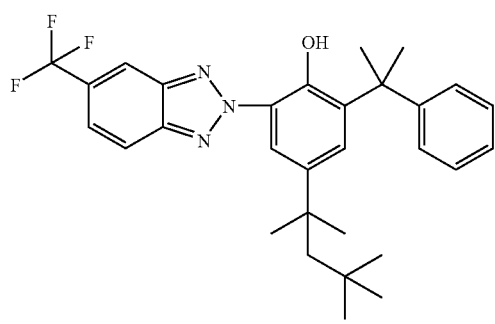
20
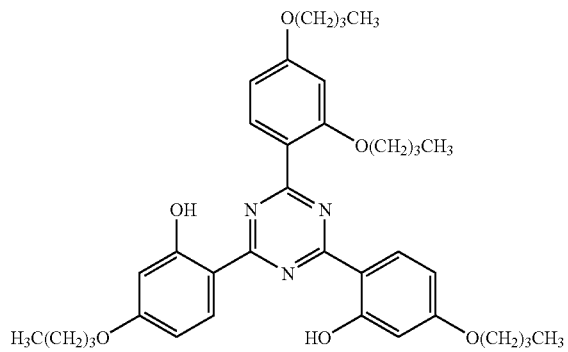
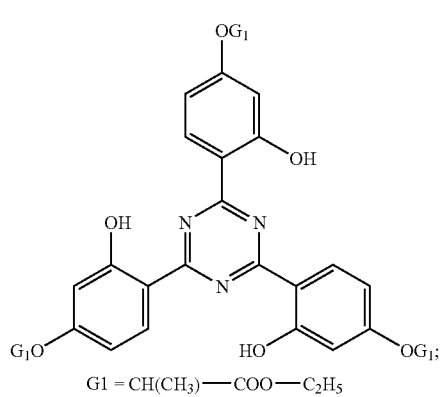
G1 = CH(CH₃)—COO—C₂H₅
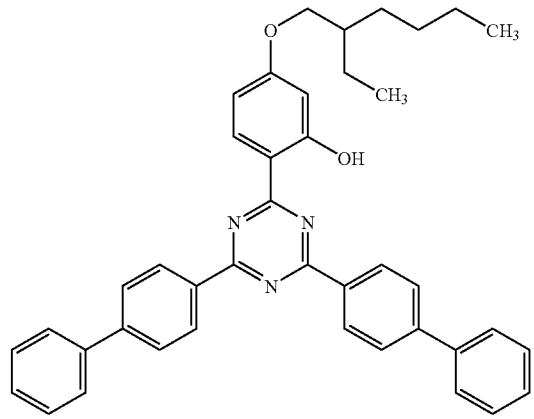
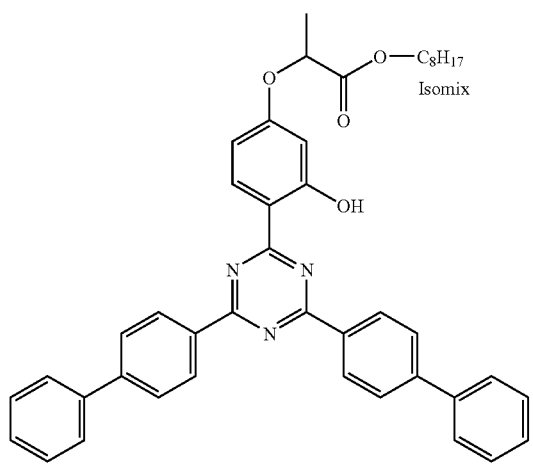
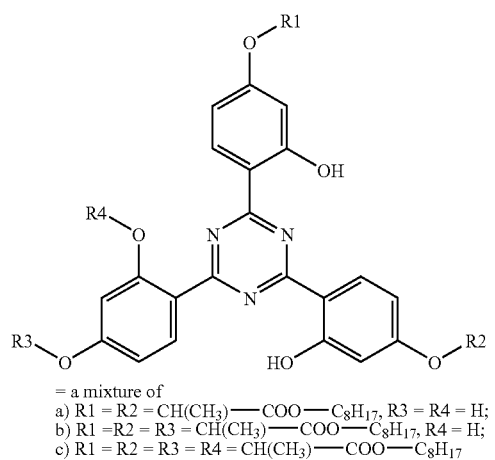
= a mixture of
a) R1 = R2 = CH(CH₃)—COO—C₈H₁₇, R3 = R4 = H;
b) R1 = R2 = R3 = CH(CH₃)—COO—C₈H₁₇, R4 = H;
c) R1 = R2 = R3 = R4 = CH(CH₃)—COO—C₈H₁₇

-continued
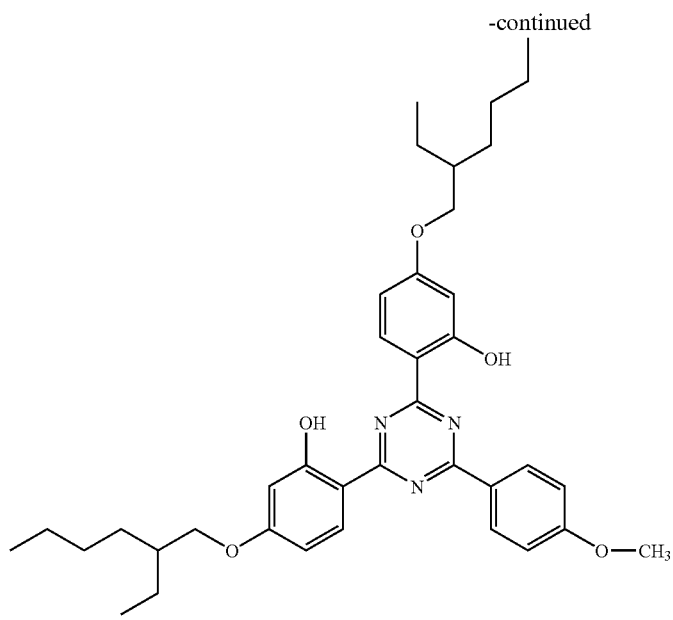
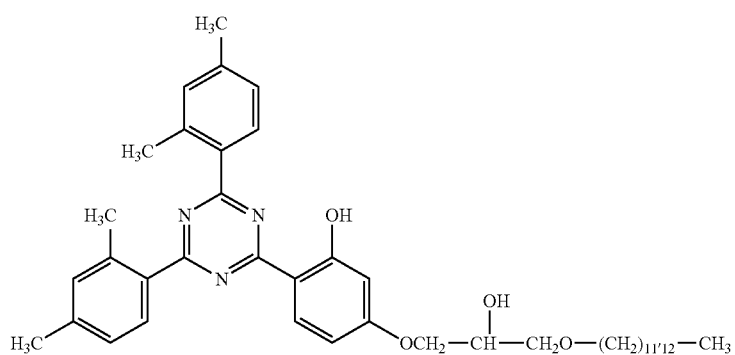
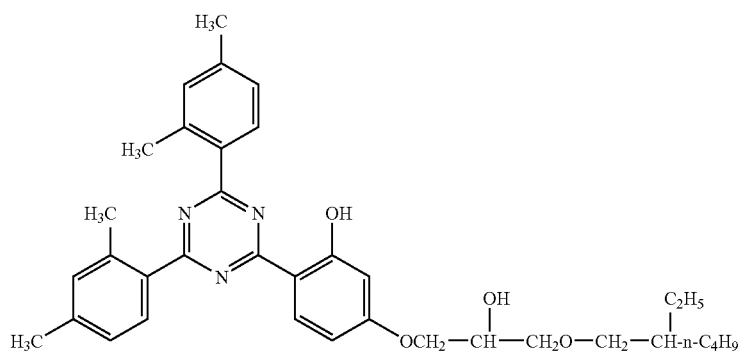
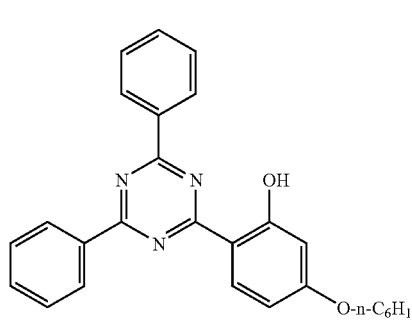
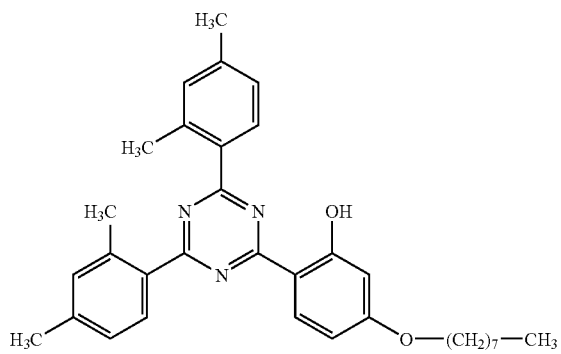

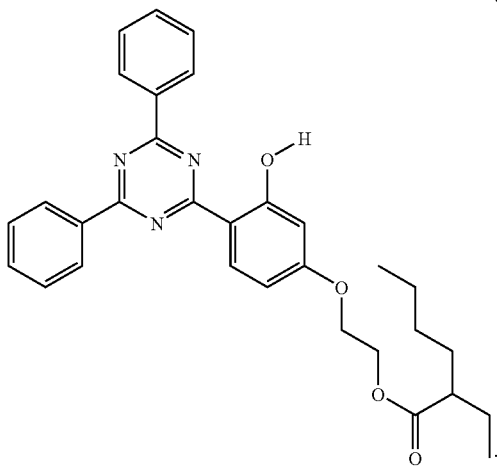

The hydroxyphenyl triazine UV-absorbers are known and are partially items of commerce.

The most suitable benzotriazole UV-absorbers are commercially available under the Trade Names TINUVIN 213®, TINUVIN 326®, TINUVIN 900®, TINUVIN 328® and TINUVIN 350® TINUVIN 360®, TINUVIN 571®.

One or more of these further additives are usually contained in an amount of 0.01 to about 10% of the composition, often in a concentration level of about 0.1 to 5% by weight of the final composition. Important are, for example, antioxidants (e.g. phenolic antioxidants and/or phosph(on)ites listed above) and, for many applications, flame retardants. Clarifiers/nucleating agents may be added to provide or improve transparency, especially in polyolefin compositions. Especially preferred is the combination of the present nano shaped transition metal particles with light stabilizers such as UV absorbers and/or sterically hindered amines (HALS).

In another embodiment of the invention further to the nano shaped transition metal particles there may be present in the composition as further component solid nano-scaled particles of a thickness of less than 200 nm, which consist of an oxide of zinc and/or a nitride of a transition metal of group III, IV, V, VI of the periodic system, each of which is doped with one or more of the elements belonging to main groups III and IV of the periodic system, or consist of undoped vanadium nitride or scandium nitride.

In particular the nitride is selected from nitrides of scandium, yttrium, lanthanum including the lanthanides, titanium, zirconium, hafnium, vanadium, niobium, tantalum, chromium, molybdenum, wolfram; the doping elements are selected from boron, aluminum, gallium, indium, thallium, carbon, silicon, germanium, tin, lead; the particle preferably consisting of aluminum doped zinc oxide, indium doped zinc oxide, gallium doped zinc oxide, aluminum doped titanium nitride, indium doped titanium nitride, gallium doped titanium nitride, aluminum doped vanadium nitride, indium doped vanadium nitride, gallium doped vanadium nitride, vanadium nitride, aluminum doped scandium nitride, indium doped scandium nitride, gallium doped scandium nitride, scandium nitride.

Useful oxides are, for example, doped zinc oxides such as
AZO (Aluminum Zinc Oxide)
IZO (Indium Zinc Oxide)
GaZO (Gallium Zinc Oxide)

Examples of nitride and doped nitride materials useful as further components in the invention are the following ones:

AlTiN (titanium nitride doped with Aluminium)
InTiN (titanium nitride doped with Indium)
GaTiN (titanium nitride doped with Gallium)
VN (vanadium nitride)
AlVN (vanadium nitride doped with Aluminium)
InVN (vanadium nitride doped with Indium)
GaVN (vanadium nitride doped with Gallium)
ScN (scandium nitride)
AlScN (scandium nitride doped with Aluminium)
InScN (scandium nitride doped with Indium)
GaScN (scandium nitride doped with Gallium)

Normal Zinc Oxide shows no absorption in the NIR region: doping transforms the not conducting in a conducting material which shows absorption in the NIR region.

Regarding the doping level, the present oxides and nitrides may be represented by the formulae:

$$X_a Zn_b O_c \qquad (II)$$

$$X_a Y_d N_e \qquad (III)$$

where X is one or more of the elements belonging to main group III and/or IV of the periodic system, Y is a transition metal belonging to group III, IV, V and/or VI (see above for more details of elements belonging to these groups); indices a-e indicate the abundance of the components, with formula (II) obeying to the condition a<b<c, and formula (III) obeying to the condition a<d less or equal to e. Doping levels, for example of Al, Ga and/or In in ZnO or TiN, often are in the range 0.01 to about 20, especially 0.1 to 10% by weight of the final particle material. The nanoparticles are solid and often, but not necessarily, cristalline. They may be prepared according to methods known in the art, e.g. using sputtering, thermal evaporation, chemical vapor deposition (CVD), spray pyrolysis and sol-gel processes; the materials often are commercially available.

Preferred materials are zinc oxide doped with Al, Ga, In; titanium nitride doped with Al; vanadium nitride or especially scandium nitride; or vanadium nitride or especially scandium nitride doped with Al, Ga, In. Of special importance are Ga or especially Al as doping elements.

Also of special interest are the following materials: ATO (Tin oxide doped with Antimony), ITO (Tin oxide doped with Indium), AZO (Zinc oxide doped with Aluminum), IZO (Zinc oxide doped with Indium), GaZO (Zinc oxide doped with Gallium), $LaB_6$ and doped tungsten oxides ($YWO_x$).

Such doped oxides and their use in IR shielding applications are for example described in US 2003/0122114 and U.S. Pat. No. 7,074,351.

One or more of these materials may be used.

The nanoparticles of the oxides or nitrides used as further components within the present invention are found not to interact with light as reflectors but as absorbers (scattering is present but gives only a small contribution).

Plastic materials, especially films of the present invention, containing polymers and nanoparticles as described above, advantageously may be used in technical application fields such as architectural glazing, glazing in building and construction, automotive glazing, transportation glazing, agricultural films and structures. The materials may be solid sheets, monolithic sheets, twin-wall sheets, multi-wall sheets, flat sheets, corrugated sheets, films, oriented or mono- or biaxially oriented films, lamination films, capstock films.

Specific application fields include wintergarden and veranda buildings, facades, skylights, pool covers and enclosures, roof structures, vaults, walkways, shelters, signage, interior and exterior design elements, sun shades, side window, rear window, panorama roof, greenhouses.

Main applications are heat-shielding, light management, heat management, energy management, solar control; also of importance are laser welding, security features, marking, tracers, heat transfer and NIR curing of coatings.

The nano shaped transition metal particles of the invention and optional further components may be added to the polymer material individually or mixed with one another. If desired, the individual components can be mixed with one another before incorporation into the polymer for example by dry blending, compaction or in the melt.

The incorporation of the nano shaped transition metal particles of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the nano shaped transition metal particles optionally with further additives or as additive blend to the thermoplastic polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hensen, W. Knappe, H. Potente, 1989, pp. 3-7, ISBN: 3-446-14339-4 (*Vol.* 2 *Extrusionsanlagen* 1986, ISBN 3-446-14329-7).

For example, the screw length is 1-60 screw diameters, preferably 20-48 screw diameters. The rotational speed of the screw is preferably 1-800 rotations per minute (rpm), very particularly preferably 25-400 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be pre-mixed or added individually.

The nano shaped transition metal particles of the invention and optional further additives can also be added to the polymer in the form of a masterbatch ("concentrate") which contains all the components together in a concentration of, for example, about 1% to about 40% and preferably 2% to about 20% by weight, based on the weight of the polymer composition. The transition metal content is about 8 ppm to 4% by weight, based on the weight of the polymer composition. The polymer must not be necessarily of identical structure than the polymer where the additives are added finally. In such operations, the polymer can be used in the form of powder, granules, solutions, suspensions or in the form of latices.

Incorporation can take place prior to or during the shaping operation, or by applying the dissolved or dispersed compound to the polymer, with or without subsequent evaporation of the solvent. A further possibility for incorporating the additives of the invention into polymers is to add them before, during or directly after the polymerization of the corresponding monomers or prior to crosslinking. In this context the additive of the invention can be added as it is or else in encapsulated form (for example in waxes, oils or polymers).

A further possibility for incorporating the nano shaped transition metal particles of the invention into polymers is to add them before, during or directly after the polymerization of the corresponding monomers or prior to crosslinking. In this context the additive of the invention can be added as it is or else in encapsulated form (for example in waxes, oils or polymers).

The materials containing the nano shaped transition metal particles of the invention described herein can be used for the production of moldings, rotomolded articles, injection molded articles, blow molded articles, films, tapes, surface coatings and the like.

Yet another subject of the invention is the use of nano shaped transition metal particles, prepared according to the method as described above as IR absorbers in heat shielding architectural or automotive glazing or agricultural films, laser welding, laser printing, security printing or NIR curing of coatings.

The definitions and preferences given above for the method apply also for the other aspects of the invention.

The following examples illustrate the invention.

ABBREVIATIONS

PHPM is polyhydroxypropyl methacrylate
PVP is polyvinylpyrolidon
IBA is isobornylacrylate
HDDA is hexanedioldiacrylate
MMA is methylmethacrylate Commercial Products:
Dispersing Agent: EFKA 4300 commercial product from Ciba Inc.
Dispersing Agent: EFKA 4401 commercial product from Ciba Inc.
Dispersing Agent Nuosperse FX9086 from Elementis Specialties
Synthesis and Isolation of Ag-Nanoplatelets.
Synthesis Step 0

In a 1 L flask, 423 ml of distilled water, 50 ml of a 1 mM solution of $AgNO_3$, 30 ml of 30 mM solution of sodium citrate, 0.0675 ml of isobornyl acrylate, 0.0735 ml of hexandiol diacrylate and 58.5 ml of a 2.00% solution of $H_2O_2$ are sequentially added. The solution is left under vigorous stirring and then 5.2 ml of a 100 mM $NaBH_4$ solution is added. The color of the solution changes immediately and a color transition from yellow to blue is achieved within few minutes time. The relative spectrum is shown in FIG. 1A, line A.

The reaction progress in term of prism formation is followed with both UV-VIS and DLS analysis. Stability after overnight stirring is also checked.

Synthesis Step 1

300.0 ml of freshly synthesized solution of step 0 is introduced in a closed reaction flask, equipped with mechanical stirring. 6.0 ml of 40 mM ascorbic acid solution are then added. 200.0 ml of 1 mM solution of $AgNO_3$ are added drop-wise with a syringe pump at fixed flux set at 30 ml/min. The reaction is carried out in thermostatic bath at 25° C.

Analysis of absorption spectra shows that the maximum remains approximately centered at the same wavelength but it becomes sharper and higher. (see FIG. 1A, line B)

Synthesis Step 2

Typically 250.0 ml obtained as described in step 1 are introduced in a closed reaction flask, equipped with mechanical stirring. The reaction is carried out in thermostatic bath at 25° C. For reaching absorption spectra with maximum peak around 1050 nm are introduced under stirring 13.5 ml of ascorbic acid 40 mM.

Following 450 ml of 1 mM solution of silver nitrate is added with a pump at constant flux of 30 ml/min. The final dimension of the silver nanoplatelets and relative absorption spectra can be easily tuned by amount of silver nitrate introduced (see FIG. 1A lines C, D, E, F). The ratio (mol/mol) between ascorbic acid and silver nitrate is kept equal to 1.2 mol/mol.

FIG. 1A. Absorption spectra of AgNPs. A) AgNPs as synthesized in step 0. B) AgNPs step 1. The absorption spectra of AgNPs is tuned from step 1 (300 ml) adding 1 mM $AgNO_3$ solution: 100 ml (C), 200 ml (D), 300 ml (E) and 450 ml (F) —procedure described in step 2—.

EXAMPLE 1

Silver nanoplatelets suspension obtained from step 2 is diluted to a nominal concentration of silver (atomic) of 0.089 mM. 70.0 ml of this suspension are introduced in a flask, and 0.011 ml of N-[3-(dimethylamino)propyl]methacrylamide (purity 99.0%) (Acrylic Amine/Ag molar ratio 10:1) are added under stirring. The amine/Ag molar ratio can be ranged between 5:1 and 100:1.

The role of acrylic amine is to prevent AgNPs aggregation and increase stability in water (see FIG. 1B), without the amine the particles collapse and precipitate on the reaction flask. The amine in this example is chosen with high molecular weight and boiling point to avoid loses during solvent evaporation.

To the former stabilized AgNPs water suspension 1.09 ml of dispersant Efka 4300 alcoholic solution (12.1% w/w, 0.766 g/cm$^3$) is added under vigorous stirring; achieving a weight percentage of Ag on the Efka matrix of 0.66% The mixture so obtained is left under stirring overnight in a thermostatic bath set up at 30° C.

The quantity of dispersant has been adjusted in order to achieve a weight percentage of Ag in the dispersant matrix equal to 0.44%, 0.66% or 0.88% w/w. The water is then removed under vacuum keeping the flask temperature below 40° C.

The dried Efka matrix containing the AgNPs is then dispersed in 70.0 ml methyl methacrylate (MMA) restoring the nominal silver concentration to 0.089 mM (see Figure C).

The combination of acrylic amine and Efka dispersants (both 4300 of present example and E4401 reported in example 2) gives rise to homogeneous MMA dispersions.

Figure 1B:
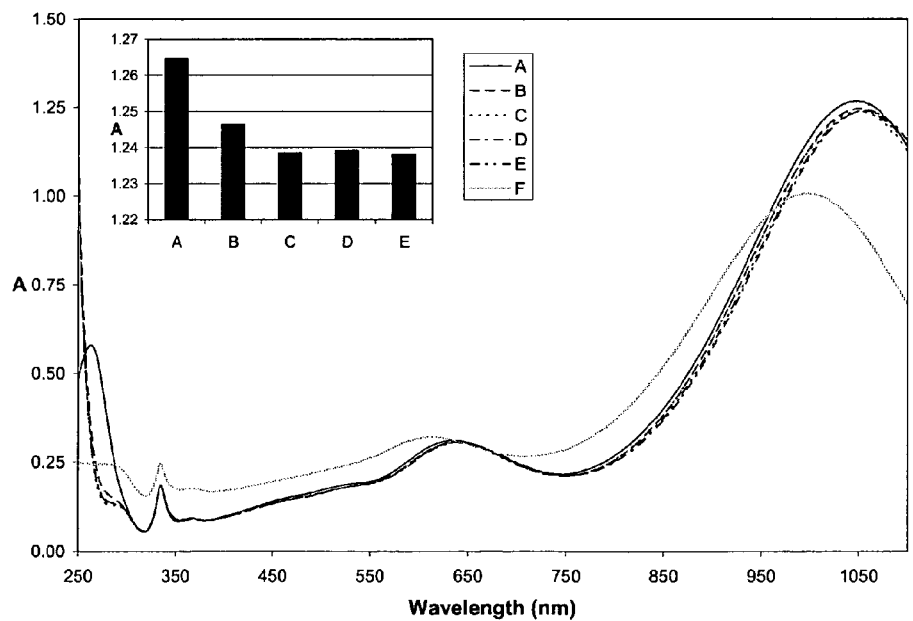

FIG. 1B. The graph shows the absorption spectra of: AgNPs step 2 as synthesized (A) after adding Acrylic Amine 15:1 (B), same material has been analyzed after 24 hours (C), 72 hours (D) and 144 hours (E). Inset: peak intensity vs time. As comparison is reported the spectra (F) of AgNPs step 2 after 144 h without acrylic amine: the maximum peak is blue-shifted and reduced in intensity. When dried this mixture leads mainly, even when dispersant is added, to Ag deposits and absorption is mainly destroyed.

Figure 1C:
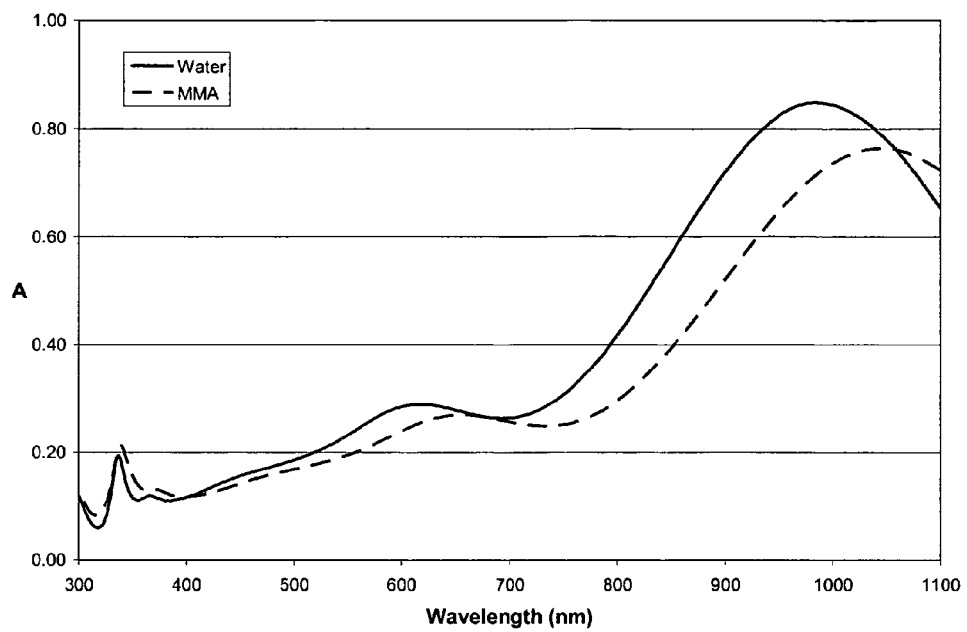

FIG. 1C. In the graph are reported the absorption spectra of: AgNPs step 2 with acrylic amine in water, and after re-dispersion in MMA using N-[3-(dimethylamino)propyl] methacrylamide (acrylic amine/Ag molar ratio 10:1) and Efka 4300 (Ag/Efka 0.66% w/w).

Figure 1D:
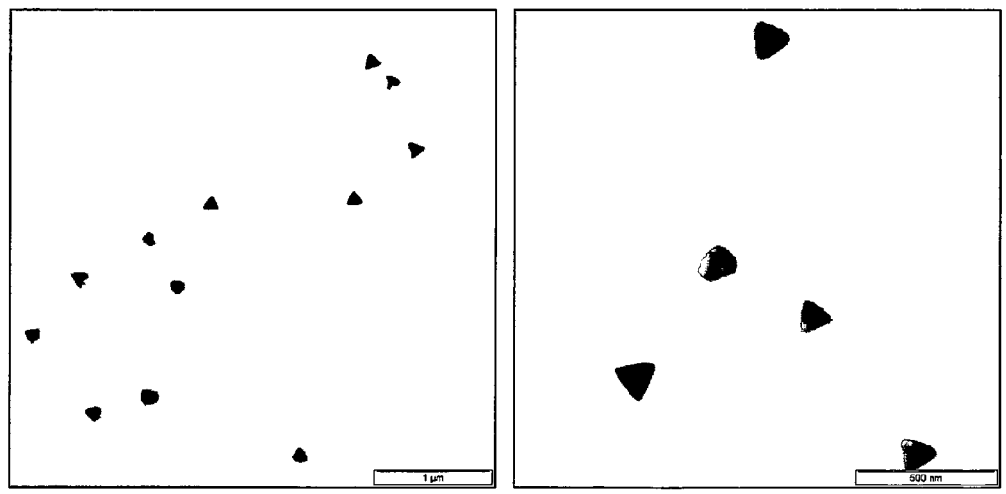
Figure 1E:
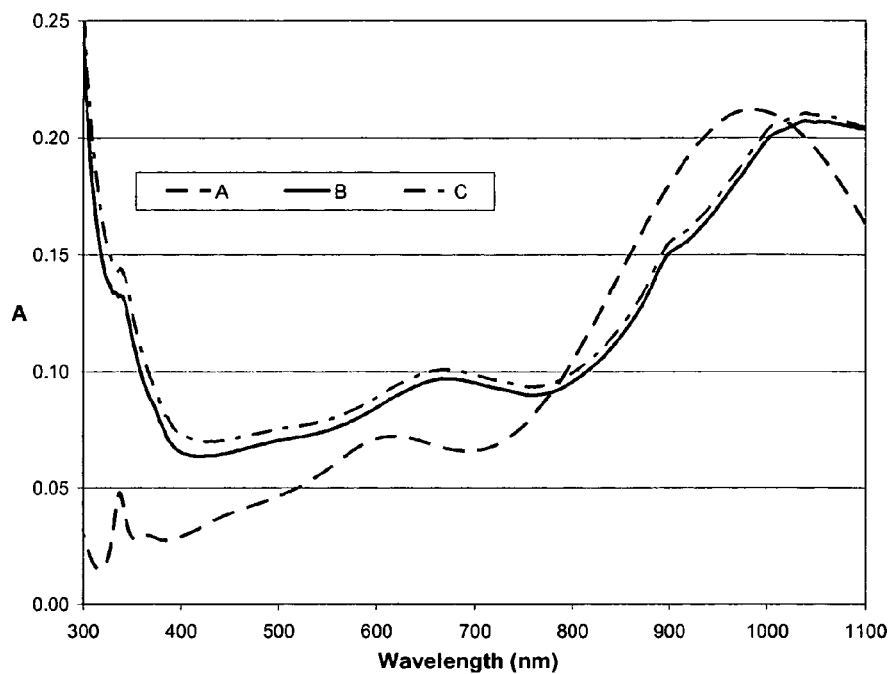
Figure 1F:
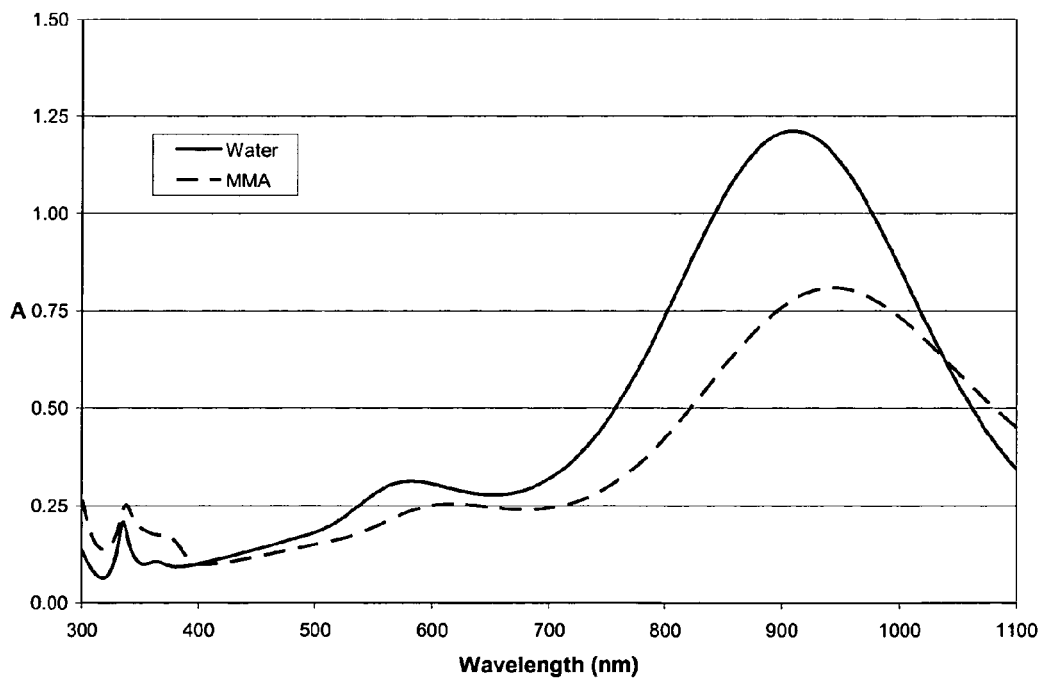
Figure 1G:
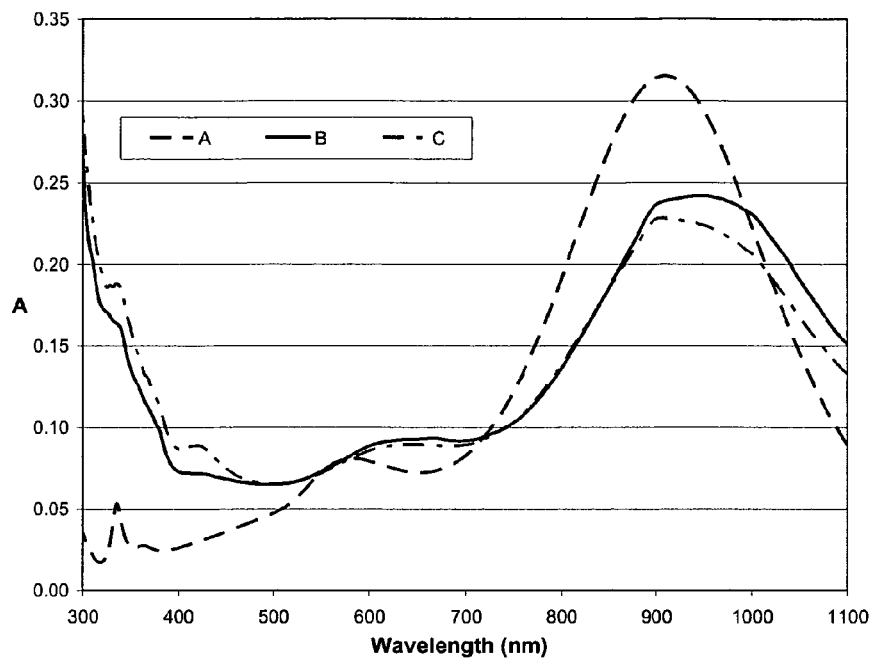
Figure 1H:
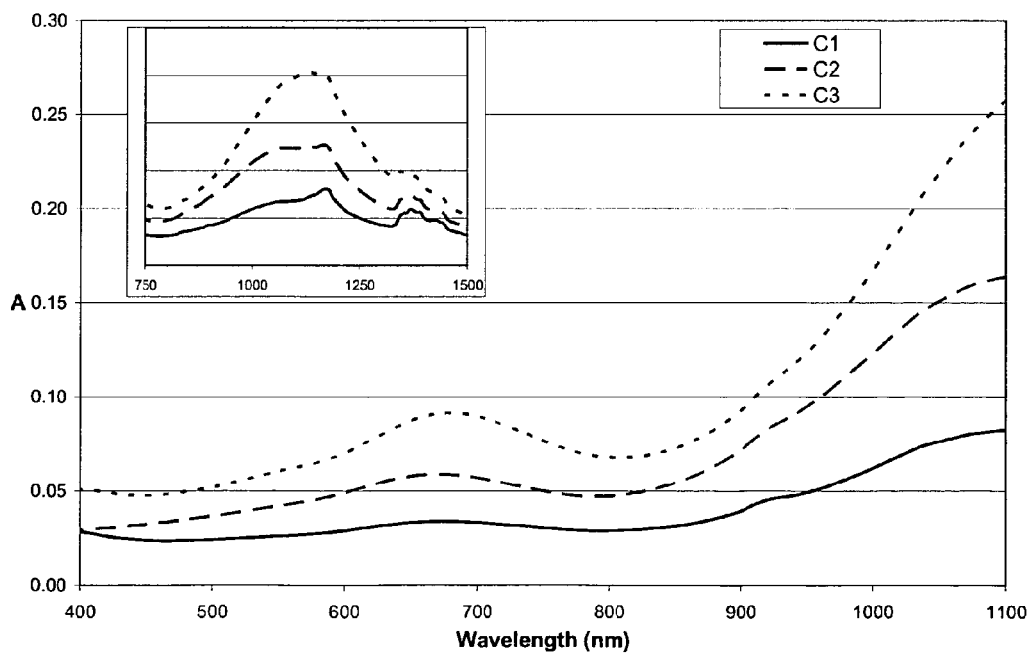

FIG. 1D. The figure shows the TEM picture of AgNPs in MMA.

Realisation of PMMA Plaques
Pre-Polymerization 0.197 g (0.3% w/w) of initiator lauryl peroxide are added to 70.0 ml of AgNPs suspended in freshly distilled MMA, as described above, and placed in a closed reaction flask. The mixture is kept under stirring and placed in a thermostatic bath at 60° C. for 3 hours. After about 3 hours the suspension shows increased viscosity due to the formation of oligomers. The syrup is then quickly cooled placing the containers into an ice bath until it cools down at room temperature. The flask is put in vacuum oven at room temperature for 30 minutes to outgas the liquid.

Polymerization

The prepolymers are cast in moulds (filled up 95%) in order to obtain plaques of 2-3 mm thickness. The moulds are placed in ventilated oven at 60° C. for 15 hours. Then 3 hours at 120° C.

The plaques are removed from the mould then optical spectra are recorded. To estimate the quality of the method the spectral intensities are compared with starting materials (AgNPs stabilized in water with acrylic amine). Moreover to test thermal stability some of the plaques are treated at 180° C. for 20 minutes.

All the combinations of acrylic amide and Efka 4300 ratios tested are summarized in table 1 together with the performance recorded.

FIG. 1E.

Absorption spectra of AgNPs stabilized in water with N-[3-(dimethylamino)propyl]methacrylamide/Ag 10:1 (A); (B) the slab realized using procedure described in the text for an amount of Efka 4300 in order to achieve Ag/E4300 0.66% w/w; (C) Same slabs after a thermal treatment at 180° C. for 20'. All the spectra have been normalized to the same optical path.

TABLE 1

| Acrylic Amine*/Ag mol ratio | Ag/E4300 % w/w | Absorbance residue | Absorbance residue 180° C. 20' | Haze % | T % | Thickness (mm) |
|---|---|---|---|---|---|---|
| 5 | 0.44 | 1.000 | 0.68 | 10.1 | 79.0 | 2.50 |
| 10 | 0.44 | 0.895 | 0.77 | 15.0 | 83.5 | 2.10 |
| 20 | 0.44 | 1.000 | | 12.9 | 83.2 | 1.70 |
| 50 | 0.44 | 0.272 | | 11.0 | 89.5 | 1.75 |
| 100 | 0.44 | 0.173 | | 13.1 | 89.8 | 2.75 |
| 5 | 0.66 | 0.789 | | 13.1 | 79.5 | 2.50 |
| 10 | 0.66 | 0.950 | 0.96 | 9.1 | 82.8 | 2.50 |
| 50 | 0.66 | 0.461 | | 14.4 | 89.4 | 1.55 |
| 100 | 0.66 | 0.292 | | 20.0 | 88.6 | 1.90 |
| 5 | 0.88 | 0.868 | | 7.0 | 78.8 | 2.50 |
| 10 | 0.88 | 0.868 | 0.74 | 4.0 | 86.8 | 1.70 |
| 20 | 0.88 | 0.604 | | 5.0 | 86.4 | 1.75 |

*N-[3-(dimethylamino)propyl]methacrylamide

The table summarizes the values of residual absorbance obtained for several N-[3-(dimethylamino)propyl]methacrylamide/Ag and Ag/E4300 ratios.

EXAMPLE 2

The silver nanoplatelets suspension obtained from step 2 is diluted to a nominal concentration of silver (atomic) of 0.089 mM. 70.0 ml of this suspension are introduced in a flask, and 0.057 ml of N-[3-(dimethylamino)propyl]methacrylamide (purity 99.0%) (Acrylic Amide/Ag molar ratio 50:1) are added under stirring. The amide/Ag molar ratio is ranged between 10:1 and 100:1.

To the former stabilized AgNPs water suspension 1.13 ml of dispersant Efka 4401 alcoholic solution (16.8% w/w, 0.798 g/cm$^3$) are added under vigorous stirring. The mixture so obtained is left under stirring overnight in a thermostatic bath set up at 30° C.

The quantity of dispersant is adjusted in order to achieve a weight percentage of Ag in the dispersant matrix equal to 0.44%, 0.66% or 0.88% w/w.

The water is then removed under vacuum keeping the flask temperature below 40° C. Water residues can be removed by azeotrope vacuum distillation with 50.0 ml of ethyl acetate.

The dried Efka matrix containing the AgNPs is then dispersed in 70.0 ml methyl methacrylate (MMA) restoring the nominal silver concentration to 0.089 mM.

FIG. 1F.

In the graph are reported the absorption spectra of: AgNPs step 2 as synthesized, and after re-dispersion in MMA using N-[3-(dimethylamino)propyl]methacrylamide (Acrylic Amine/Ag molar ratio 50:1) and Efka 4401 (Ag/Efka 0.44% w/w).

Preparation of PMMA Plaques

PMMA plaques from monomer suspension of AgNPs and Efka 4401 are obtained in the same manner as described in example 1.

All the combinations of acrylic amine and Efka 4401 ratios tested are summarized in table 2 together with the performance realized.

FIG. 1G.

Absorption spectra of AgNPs stabilized in water with N-[3-(dimethylamino)propyl]methacrylamide/Ag 50:1 (A); (B) the plaque is realized using the procedure described in the text for an amount of Efka 4401 in order to achieve Ag/E4401 0.44% w/w; (C) Same plaque after a thermal treatment at 180° C. for 20'. All the spectra are normalized to the same optical path.

TABLE 2

| Acrylic Amine*/Ag mol ratio | Ag/E4401 % w/w | Absorbance residue | Absorbance residue 180° C. 20' | Haze % | T % | Thickness (mm) |
|---|---|---|---|---|---|---|
| 10 | 0.44 | 0.562 | 0.497 | 10.5 | 86.3 | 1.78 |
| 15 | 0.44 | 0.650 | 0.594 | 9.4 | 87.3 | 1.86 |
| 20 | 0.44 | 0.733 | 0.638 | 14.5 | 86.1 | 1.90 |
| 50 | 0.44 | 0.766 | 0.707 | 10.3 | 82.4 | 2.40 |
| 100 | 0.44 | 0.849 | 0.815 | 10.9 | 82.4 | 2.40 |
| 10 | 0.66 | 0.502 | 0.446 | 6.6 | 83.7 | 2.60 |
| 15 | 0.66 | 0.584 | 0.526 | 12.0 | 83.0 | 2.50 |
| 20 | 0.66 | 0.550 | 0.565 | 8.4 | 88.6 | 1.60 |
| 50 | 0.66 | 0.742 | 0.709 | 8.4 | 83.1 | 2.40 |
| 100 | 0.66 | 0.677 | 0.728 | 9.2 | 83.3 | 2.60 |
| 15 | 0.88 | 0.474 | 0.582 | 2.5 | 89.1 | 1.80 |
| 20 | 0.88 | 0.710 | 0.617 | 13.7 | 84.4 | 1.90 |
| 50 | 0.88 | 0.727 | 0.706 | 4.5 | 87.4 | 1.65 |
| 100 | 0.88 | 0.741 | | 5.7 | 87.4 | 1.70 |

*N-[3-(dimethylamino)propyl]methacrylamide

The table summarizes the values of residual absorbance obtained for several N-[3-(dimethylamino)propyl]methacrylamide/Ag and Ag/E4401 ratios.

EXAMPLE 3

To increase the intensity of the plaques absorbance in the NIR region the concentration of the silver nanoplates has to be increased. This is achieved following the procedure described below.

A double concentration with respect to that reported in example 2 is obtained introducing 140.0 ml of AgNPs suspension (nominal Ag conc. 0.089 mM) stabilized with N-[3-(dimethylamino)propyl]methacrylamide (Amine/Ag molar ratio 50:1) in a flask. Under vigorous stirring are added 1.51 ml of dispersant Efka 4401 alcoholic solution (16.8% w/w, 0.798 g/cm$^3$); achieving a weight percentage of Ag on the Efka matrix of 0.66%. The mixture so obtained is left stirring overnight in a thermostatic bath set up at 30° C.

The water is then removed under vacuum at 40° C. Solvent residues are removed by azeotropic vacuum distillation with 100.0 ml of ethyl acetate.

The dry Efka matrix containing the AgNPs is then dispersed in 70.0 ml methyl methacrylate (MMA) achieving the nominal silver concentration to 0.178 mM. The suspension is then polymerized as described in example 2 to create a plaque.

The triple concentration is achieved with the same procedure starting from 210.0 ml of the stabilized AgNPs water suspension. The amount of dispersant solution is kept in the same proportions with Ag as in the previous examples. AgNPs in the Efka matrix are dispersed in 70.0 ml of MMA, reaching a nominal concentration of Ag of 0.267 mM. Polymerization takes place in the same manner as reported above.

For comparison in Figure H we report the results obtained together with the concentration of 0.089 mM. The spectra are scaled to the same optical path.

All the plaques samples with double and triple AgNPs concentration retain the same intensity after treatment at 180° for 20', as reported for single concentration.

Due to this high stability a PMMA masterbatch (or concentrate) can be produced to be used for blends with PC or PET

FIG. 1H.

Absorption spectra of PMMA plaques with different AgNPs concentrations. C1) Ag 0.089 mM, Abs @ 1100 nm 0.0825; C2) Ag 0.178 mM, Abs @ 1100 nm 0.164; C3) Ag 0.267 mM, Abs @ 1100 nm 0.258. Inset: full absorption maxima recorded with NIR instrument. All the spectra are normalized 1 mm optical path.

EXAMPLE 3b

Another amino acrylic monomer has been tested as well for stabilization in water of AgNPs with comparable results to the N-[3-(dimethylamino)propyl]methacrylamide.

The AgNPs suspension obtained from the step 2 is diluted to a nominal concentration of silver (atomic) of 0.089 mM. 70.0 ml of this suspension are introduced in a flask, and 0.011 ml of 2-(dimethylamino)ethylmethacrylate (purity 98.0%) (Amine/Ag molar ratio 10:1) are added under stirring. The relative absorption intensities are reported in Table 3b below.

Isolations and re-dispersions in MMA with Efka 4300 and Efka 4401 are carried out as reported in example 1 and 2 respectively.

TABLE 3b

| Dispersant | Ag/Efka % w/w | Absorbance residue | Haze % | T % | Thickness (mm) |
|---|---|---|---|---|---|
| E4300 | 0.44 | 1.000 | 12.0 | 79.0 | 2.50 |
| E4300 | 0.66 | 0.602 | 9.0 | 80.3 | 2.60 |
| E4401 | 0.44 | 0.604 | 16.4 | 83.0 | 2.50 |
| E4401 | 0.66 | 0.514 | 11.6 | 83.3 | 2.80 |

EXAMPLE 3c

The AgNPs suspension obtained from the step 2 are diluted to a nominal concentration of silver (atomic) of 0.448 mM. 50.0 ml of this suspension are introduced in a flask, and 0.0085 ml of Allylamine (purity 98.0%) (Amine/Ag molar ratio 5:1) are added under stirring. The amine/Ag molar ratio has been ranged between 5:1 and 13:1. The relative absorptions intensities are reported in Table 3c below.

Isolations and re-dispersions in MMA with Efka 4401 are carried out as reported in example 2.

TABLE 3c

| Allylamine/Ag mol ratio | Ag/E4401 % w/w | Absorbance residue | Haze % | T % | Thickness (mm) |
|---|---|---|---|---|---|
| 10 | 0.44 | 0.749 | 12.9 | 87.9 | 1.70 |

EXAMPLE 4

To a 30 ml of the solution of step 0, 0.5 ml of an ethanolic solution of Nuosperse FX9086 (8 ml of Nuosperse FX9086 up to total 50 ml ethanol solution) is added. The solution is then dried in a rotavapor system, keeping the water bath at 40° C. under high vacuum (15 Torr).

Redispersion in MMA and Polymerization to Incorporate Ag-Prisms

The residue is re-dispersed in 30 g of methylmethacrylate leading to a homogeneous blue colloidal dispersion. The optical properties of the MMA dispersion are checked trough UV-VIS analysis. The result is presented in FIG. 1I.

Figure 1I:
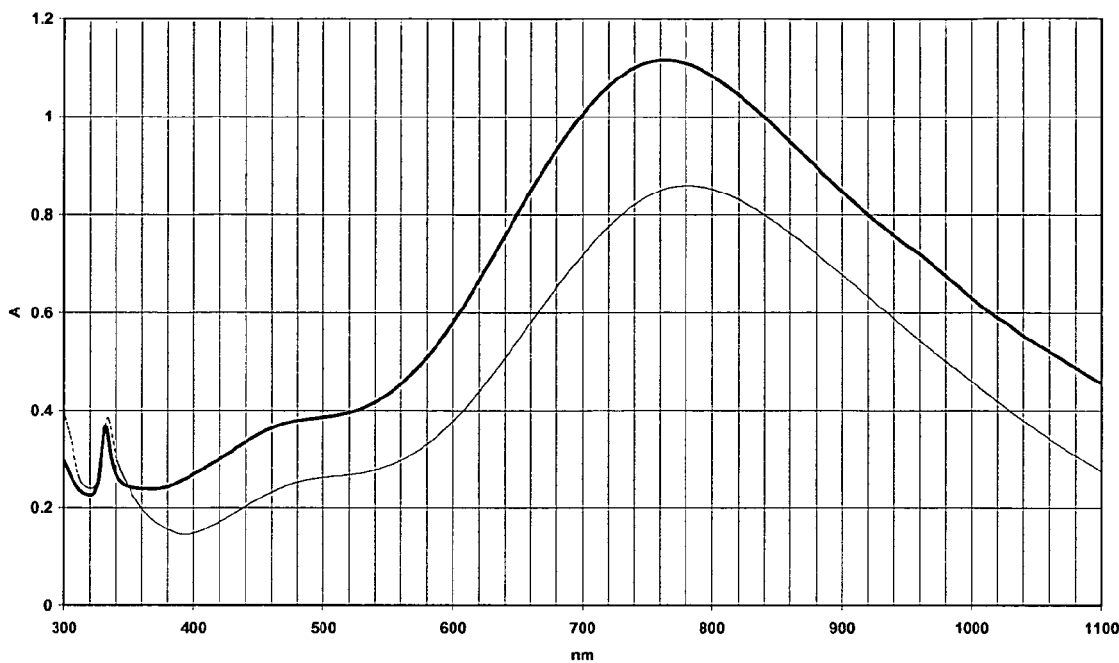

FIG. 1I shows the absorption spectrum of both aqueous and MMA dispersion (dotted line: MMA dispersion; straight line: H₂O dispersion To 10 g of the previously prepared MMA-Ag prism dispersion, 0.5 g of photoinitiator Irgacure 184 is added. The solution is deposited in a Petri dish and exposed to a UV lamp allowing photochemical polymerization to occur. A thin bluish film of polymethyl methacrylate with incorporated Ag-prisms is obtained.

Thermal radical polymerization is also carried out. To 10 g of the previously prepared MMA-Ag prism dispersion, a catalytic amount of lauryl peroxide is added. The solution is warmed up to 85° C. for half an hour allowing polymerization to occur. UV-VIS spectrum of the obtained polymer is registered showing that absorption is preserved in PMMA analogously to previous examples.

EXAMPLE 5

To a 30 ml aliquot of the Ag prisms solution described as step 0, 0.5 ml of an ethanolic solution of a the dispersing agent EFKA 4300 (8 ml of EFKA 4300 up to total 50 ml ethanol solution) is added, giving rise to an emulsion type of solution. The solution is then dried in a rotavapor, keeping the water bath at 40° C. and under high vacuum (15 Torr).

The obtained material is then re-dispersed in freshly distilled MMA and later polymerized with 0.1% laurylperoxide. 0.15% TINUVIN P, 0.15% TINUVIN 770 are added as further additives.

Firstly the mixture is pre-polymerized at 60° C. in a test tube for ca. 2 hours and then in a second step the syrup is polymerized at 60° C. in a water bath followed 15 hours in an oven and followed by the final polymerization: 3 hours oven 120° C. A final plastic article where Ag prisms are incorporated is resulting.

Artificial Weathering

The samples are irradiated in a Weather-Ometer Ci65 from ATLAS in accordance with ASTM G 155/ASTM G 151, Xenon lamp with 2 borosilicate filters, 0.35 W/m2 at 340 nm, 63±3° C. black panel temperature, 102 min dry and light, 18 min water spray and light.

Evaluation

The UV-VIS-NIR Spectrum is recorded on a Shimadzu UV 3101 UV with ISR3100 integrating sphere: Parameter: Slit width 20, wavelength 250-1800 nm, Scan speed fast, Light Source change at 360 nm and Detector change at 830 nm.

The relative absorption is calculated by the absorption at the maximum divided by the initial absorption at the same wavelength.

WOM exposure of the samples described in example 1, 2 and 3 did not show strong variation of the NIR absorption. For example plaques from example 5 show 95% Rel NIR abs after 2000 h WOM:

|  | WOM h | | | | | | |
|---|---|---|---|---|---|---|---|
|  | 0 | 261 | 498 | 739 | 1002 | 1505 | 2004 |
| Rel Abs [%] | 100 | 93 | 95 | 94 | 95 | 96 | 95 |

The invention claimed is:
1. A method, comprising
a) adding, to an aqueous solution of a transition metal salt, a reducing agent and an acrylate or methacrylate monomer, an acrylate or methacrylate oligomer, or a polyacrylate or polymethacrylate, thereby obtaining a colloidal solution comprising nano shaped transition metal particles;
either b1) treating the colloidal solution with a peroxide or
b2) exposing the colloidal solution to UV- or visible light;

c) adding a water soluble amine to the colloidal solution after said b1) treating or said b2) treating is performed; and d) re-dispersing nano shaped transition metal particles together with a dispersing agent in a liquid acrylate or methacrylate monomer, wherein the transition metal of the nano shaped transition metal particles comprises at least one member selected from the group consisting of Zn, Ag, Cu, Au, Ta, Ni, Pd, Pt, Co, Rh, Ir, Fe, Ru, and Ti.

2. The method according to claim 1, wherein the transition metal is silver, which is in the form of a silver(I) salt selected from the group consisting of $AgNO_3$, $CH_3CO_2Ag$, $AgClO_4$, $Ag_2SO_4$, $Ag_2O_3$, $AgBF_4$, $AgIO_3$, AgCl, AgI and AgBr.

3. The method according to claim 1, wherein the acrylate or methacrylate monomer or oligomer is polyfunctional, trifunctional, difunctional or monofunctional.

4. The method according to claim 3, wherein the monofunctional acrylate is represented by formula (I)

$$CH_2=C(R_a)-(C=O)-R_b, \quad (I)$$

wherein $R_a$ is hydrogen or $CH_3$, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, $C_5$-$C_{11}$heterocycloalkyl, hydroxy-substituted $C_1$-$C_{18}$alkylamino or hydroxy-substituted di($C_1$-$C_{18}$alkyl)amino, —O—$CH_2$—$CH_2$—$N(CH_3)_2$ or —O—$CH_2$—$CH_2$—$N^+H(CH_3)_2An^-$ or the residue of a bi- or tricyclic hydrocarbon;

$An^-$ is a anion of a monovalent organic or inorganic acid;

Me is a monovalent metal atom or the ammonium ion.

5. The method according to claim 1, wherein the polyacrylate or polymethacrylate is prepared from a monomer represented by formula (I)

$$CH_2=C(R_a)-(C=O)-R_b, \quad (I)$$

wherein $R_a$ is hydrogen or $CH_3$, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, $C_5$-$C_{11}$heterocycloalkyl, hydroxy-substituted $C_1$-$C_{18}$alkylamino or hydroxy-substituted di($C_1$-$C_{18}$alkyl)amino, —O—$CH_2$—$CH_2$—$N(CH_3)_2$ or —O—$CH_2$—$CH_2$—$N^+H(CH_3)_2An^-$ or the residue of a bi- or tricyclic hydrocarbon;

$An^-$ is a anion of a monovalent organic or inorganic acid;

Me is a monovalent metal atom or the ammonium ion.

6. The method according to claim 1, wherein the reducing agent comprises at least one member selected from the group consisting of borane, copper hydride, DIBAL-H, diborane, diisobutylaluminium hydride, ascorbic acid, dimethylsulfide borane, formaldehyde, formic acid, hydrazine, isopropanol, lithium aluminum hydride, lithium tetrahydridoaluminate, nickel, nickel borohydride, oxalyc acid, polymethylhydrosiloxane, sodium bis(2-methoxyethoxy)aluminumhydride, sodium borohydride, sodium cyanoborohydride, sodium hydrosulfite, sodium tetrahydroborate, sodium triacetoxyborohydride, tributylstannane, tributyltin hydride, trichlorosilane, triphenylphosphine, triphenylphosphite, triethylsilane, tris(trimethylsilyl)silane, and sodium borohydride.

7. The method according to claim 1, wherein the peroxide comprises at least one member selected from the group consisting of $H_2O_2$, acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy) 3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2bis(t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl)benzene, 3,5-bis(t-butylperoxy)3,5-dimethyl-1,2-dioxolane, di-t-butyl peroxide, 2,5-dimethylhexyne-2,5-di-t-butylperoxide, and 3,3,6,6,9,9-hexamethyl 1,2,4,5-tetraoxa cyclononane.

8. The method according to claim 1, wherein the water soluble amine is represented by formula (I)

wherein R', R'', R''', independently, represent hydrogen, $C_1$-$C_{18}$alkyl, $C_2$-$C_{18}$alkenyl, $C_2$-$C_{18}$alkinyl, phenyl or a group represented by formula (II)

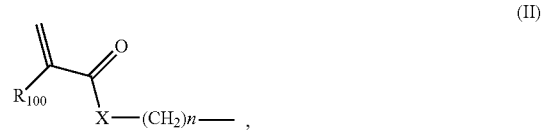

wherein X is O or NH and $R_{100}$ is hydrogen or methyl; and n is a number from 1 to 12.

9. The method according claim 1, wherein the dispersing agent is a non-ionic dispersing agent comprising amine groups.

10. The method according to claim 1, wherein the nano shaped transition metal particles extent to a length of 15-500 nm and a thickness of 2-30 nm or the three axis defining them have a length independently between 2 and 250 nm.

11. The method according claim 1, wherein said b1) treating is performed.

12. The method according claim 1, wherein said b2) exposing is performed.

13. A method, comprising a) adding, to an aqueous solution of a transition metal salt, a reducing agent and an acrylate or methacrylate monomer, an acrylate or methacrylate oligomer, or a polyacrylate or polymethacrylate, thereby obtaining a colloidal solution comprising nano shaped transition metal particles;

b1) treating the colloidal solution with a peroxide;

c) adding a water soluble amine to the colloidal solution after said b1) treating is performed; and d) isolating nano shaped transition metal particles from the colloidal solution or re-dispersing nano shaped transition metal particles together with a dispersing agent in a liquid acrylate or methacrylate monomer, wherein the transition metal of the nano shaped transition metal particles comprises at least one member selected from the group consisting of Zn, Ag, Cu, Au, Ta, Ni, Pd, Pt, Co, Rh, Ir, Fe, Ru, and Ti, and said b1) treating is performed, and the treating is carried out at a temperature of from 20 to 40° C.

14. The method according claim 1, wherein said b2) exposing is performed and wavelength of the UV- or visible light is from 250 to 750 nm.

15. The method according to claim 13, wherein the transition metal is silver, which is in the form of a silver(I) salt selected from the group consisting of $AgNO_3$, $CH_3CO_2Ag$, $AgClO_4$, $Ag_2SO_4$, $Ag_2O_3$, $AgBF_4$, $AgIO_3$, AgCl, AgI and AgBr.

16. The method according to claim 13, wherein the acrylate or methacrylate monomer or oligomer is polyfunctional, trifunctional, difunctional or monofunctional.

17. The method according to claim 16, wherein the monofunctional acrylate is represented by formula (I)

$$CH_2=C(R_a)-(C=O)-R_b, \quad (I)$$

wherein $R_a$ is hydrogen or $CH_3$, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, $C_5$-$C_{11}$heterocycloalkyl, hydroxy-substituted $C_1$-$C_{18}$alkylamino or hydroxy-substituted di($C_1$-$C_{18}$alkyl)amino, —O—$CH_2$—$CH_2$—N($CH_3$)$_2$ or —O—$CH_2$—$CH_2$—$N^+H(CH_3)_2An^-$ or the residue of a bi- or tricyclic hydrocarbon;

$An^-$ is a anion of a monovalent organic or inorganic acid;

Me is a monovalent metal atom or the ammonium ion.

18. The method according to claim 13, wherein the polyacrylate or polymethacrylate is prepared from a monomer represented by formula (I)

$$CH_2=C(R_a)-(C=O)-R_b, \quad (I)$$

wherein $R_a$ is hydrogen or $CH_3$, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyeamino, $C_5$-$C_{11}$heterocyclo alkyl, hydroxy-substituted $C_1$-$C_{18}$alkylamino or hydroxy-substituted di($C_1$-$C_{18}$alkyl)amino, —O—$CH_2$—$CH_2$—N($CH_3$)$_2$ or —O—$CH_2$—$CH_2$—$N^+H(CH_3)_2An^-$ or the residue of a bi- or tricyclic hydrocarbon;

$An^-$ is a anion of a monovalent organic or inorganic acid;

Me is a monovalent metal atom or the ammonium ion.

19. The method according claim 13, wherein said d) isolating nano shaped transition metal particles from the colloidal solution is performed.

20. The method according claim 13, wherein said d) redispersing nano shaped transition metal particles together with a dispersing agent in a liquid acrylate or methacrylate monomer is performed.

* * * * *